April 29, 1969  F. FINNEGAN  3,441,048
LIQUID LEVEL CONTROL
Filed Nov. 29, 1965

Francis Finnegan,
Inventor.
Koenig, Senniger, Powers and Leavitt,
Attorneys.

United States Patent Office 3,441,048
Patented Apr. 29, 1969

---

3,441,048
LIQUID LEVEL CONTROL
Francis Finnegan, Plainville, Mass., assignor to Texas Instruments Incorporated, Dallas, Tex., a corporation of Delaware
Filed Nov. 29, 1965, Ser. No. 510,312
Int. Cl. F16k *21/18, 31/42;* H01h *47/26*
U.S. Cl. 137—392          4 Claims

ABSTRACT OF THE DISCLOSURE

A liquid level controller is disclosed in which a pair of self-heated NTC thermistors are employed for sensing the level of a liquid within a vessel. The thermistors are mounted at different levels to provide a predetermined differential in the operation of the control. The liquid level is varied by an electrically actuated valve and the thermistors are alternately connected in series with the operating winding of a relay which actuates the valve so that the winding is directly energized by current flowing through the operative thermistor.

---

This invention relates to liquid level control and more particularly to apparatus and methods for controlling, within predetermined limits, the level of a liquid within a vessel, preferably employing self-heating thermistors for sensing the liquid level at said limits.

It has previously been proposed to employ a self-heating thermistor as a liquid level sensor and to have such a sensor operate a valve, directly or indirectly, for maintaining the level of liquid within a vessel at a preselected level. However, such controls are, except for the overshoot caused by the inherent thermal time constant of the sensor, essentially zero differential controls. That is, there is no definite dead zone or differential in which the control merely remains in its last state. Rather, the control reverses state just as the liquid level surface passes the sensor whether it is moving up or down. As will be understood in the art, this lack of a definite differential is conducive to hunting.

Among the several objects of the present invention may be noted the provision of apparatus for controlling the level of a liquid within predetermined limits, the upper and lower limits being distinct and separate so that a definite dead zone or differential is established; the provision of such apparatus in which the upper and lower limits may be set independently of each other; the provision of such apparatus which employs self-heating thermistor liquid level sensors; the provision of such apparatus which is highly stable; and the provision of such apparatus which is reliable and which is relatively simple and inexpensive. Other objects and features will be in part apparent and in part pointed out hereinafter.

Briefly, apparatus according to the present invention will control, within predetermined limits, the level within a vessel of a liquid having substantial cooling capacity. The apparatus includes two thermistors adapted to be mounted for contact with the liquid at different levels. Valve means are provided for varying the liquid level within the vessel and the valve means is selectively actuated by switching means operated under control of the thermistors. The switching means has an input circuit adapted for alternate control by the thermistors and transfer means, controlled by the input circuit and actuated simultaneously with the valve means, for connecting the thermistors alternately to the input circuit. The thermistors are connected to a source of current for heating them, when not in contact with the liquid, to a temperature at which the thermistor resistance will actuate the switching means, contact with the liquid being effective to cool the thermistor to a temperature at which the thermistor resistance will deactuate the switching means. Accordingly, the valve means is actuated by the switching means to maintain the level of liquid between the levels of the two thermistor sensors.

The invention accordingly comprises the apparatus and methods hereinafter described, the scope of the invention being indicated in the following claims.

In the accompanying drawings, in which several of various possible embodiments of the invention are illustrated, FIG. 1 is a diagrammatic illustration of apparatus according to the invention for maintaining the level of liquid within a vessel between predetermined limits;

Corresponding reference characters indicate corresponding parts throughout the several views of the drawings.

Figure 1:
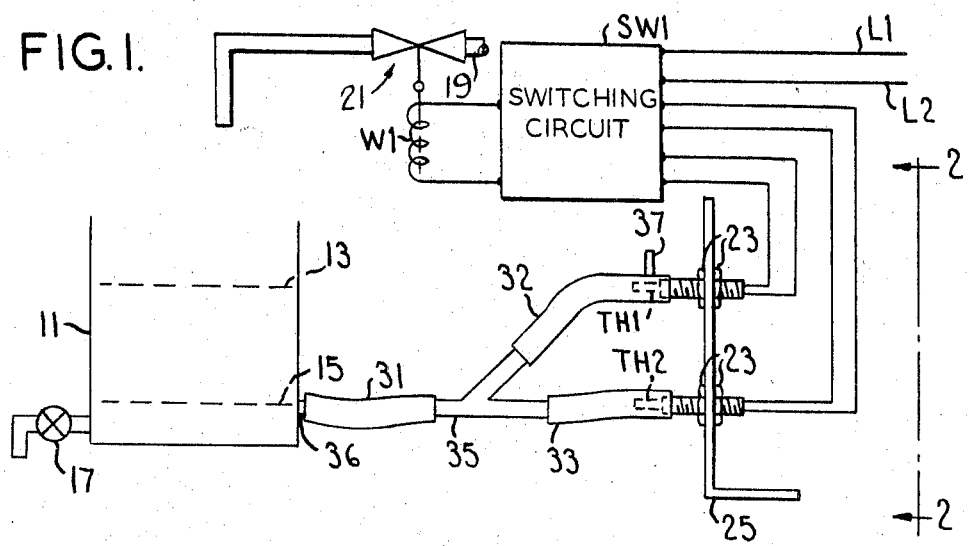
Figure 2:
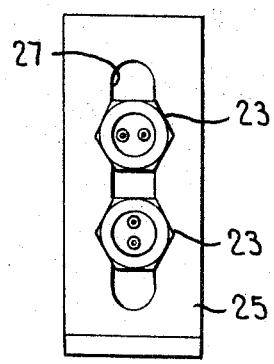
FIG. 2 is a view substantially on the line 2—2 of FIG. 1 showing the mounting of two thermistors.

Referring now to FIG. 1, there is indicated at 11 a vessel or tank for containing a liquid the level of which is to be maintained between a preselected upper limit indicated at 13 and a preselected lower limit indicated at 15. Liquid may be drawn off from the tank 11 by means of a valve 17.

Liquid for replenishing the level within tank 11 is supplied through a pipe 19 from any suitable source (not shown). The flow of liquid into tank 11 from pipe 19 is controlled by a conventional solenoid valve 21. Valve 21 includes an actuating winding W1 which, when energized, actuates valve 21 to its open position thereby allowing liquid to flow into tank 11. Winding W1 is selectively energized by a switching circuit SW1 which is controlled by a pair of self-heating thermistors TH1 and TH2.

Thermistors TH1 and TH2 are adjustably mounted by means of clamp nuts 23 on a bracket 25 having an elongate slot 27 therein through which the thermistors project. The vertical position of each of the thermistors TH1 and TH2 can thus be adjusted by loosening the respective clamp nuts 23. Thermistors TH1 and TH2 are maintained in fluid communication with the liquid in tank 11 by means of flexible tubes 31, 32 and 33, these tubes being interconnected by a wye fitting 35 which permits a single outlet 36 on tank 11 to be connected to both of the thermistors. A vent 37 is provided in the tubing 32 at the upper of the two thermistors (TH1) so that the level of the liquid within the tubes and in communication with the thermistors TH1 and TH2 is truly representative of the level of the liquid within tank 11. The remote mounting of thermistors and their interconnection with tank 11 by flexible tubing facilitates the independent adjustment of the heights of the thermistors. As is explained in greater detail hereinafter, the heights of the thermistors determine the limits between which the liquid level is controlled and thus these limits are also independently adjustable.

Figure 3:
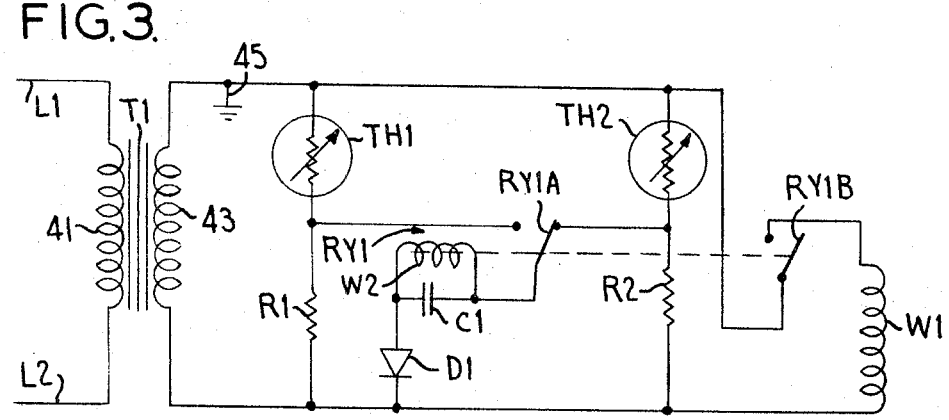
FIG. 3 is a schematic circuit diagram of the control apparatus of FIG. 1.

Switching circuit SW1 and its interconnections with the various system components are illustrated in FIG. 3. Alternating current for powering the system is obtained through a pair of leads L1 and L2 from a suitable source or supply mains (not shown). The primary winding 41 of a stepdown and isolation transformer T1 is connected across leads L1 and L2. Transformer T1 includes a secondary winding 43 which provides A.C. at a reduced voltage suitable for heating the thermistors TH1 and TH2 and for energizing the switching circuitry and the valve actuating winding W1. One side of secondary winding 43 is grounded as indicated at 45. Each of the thermistors TH1 and TH2 is connected for heating across secondary winding 43 by a circuit which includes a respective current limiting or ballast resistor R1 or R2.

The switching circuit includes a relay RY1 having an operating winding W2 which constitutes its input circuit and two sets of contacts RY1A and RY1B. Contacts RY1B are connected for selectively energizing the valve winding W1 when the relay winding W2 is energized. Contacts RY1A are connected for transferring control of winding W2 between thermistors TH1 and TH2 as described in greater detail hereinafter.

Relay winding W2 is adapted to be directly energized by one or the other of the thermistor probes TH1 and TH2 without additional power amplification. For this purpose, thermistors TH1 and TH2 are preferably of coaxial construction having a large ratio of surface area to mass and include a conductive outer casing, a conductive core coaxial with said casing and, between the casing and the core, a filling of a semiductor material having a substantial negative tempearture coefficient of resistivity. The fixed poles of contacts RY1A are connected to respective ones of the thermistor sensors TH1 and TH2 at the junction between the sensor and its respective ballast resistor R1 or R2. The movable arm of contacts RY1A is connected to one end of relay winding W2 for connecting the winding to the sensors TH1 and TH2 alternately. The other end of winding W2 is connected to the ungrounded side of secondary winding 43 through a diode D1 so that only rectified or unidirectional current is applied to winding W2. Winding W2 is shunted by a capacitor C1 which stores sufficient energy to maintain winding W2 energized for the brief interval during which the movable arm of contacts RY1A is in flight between the two fixed poles.

The operation of this apparatus is as follows: When power is applied to the system through lines L1 and L2, thermistors TH1 and TH2 are heated by the current flowing through them and resistors R1 and R2 respectively. The temperature to which each probe heats and hence its resistance is strongly influenced by whether the probe is immersed in liquid or not. Having negative tempearture coefficients of resistivity, the thermistor probes TH1 and TH2 have equilibrium current-voltage characteristics which, as understood by those skilled in the art, include a positive resistance region at low current levels and a negative resistance region at high current levels. A very pronounced change in current level is obtained when one of the thermistor probes is contacted by the liquid, provided the value of the respective ballast or load resistor and the supply voltage are properly chosen in relation to the thermal equilibrium characteristics of the probe so that equilibrium is reached in the positive resistance region when the probe is contacted by the liquid and equilibrium is reached in the negative region when it is not.

When the level of liquid within tank 11 is intermediate the heights of the therimstors TH1 and TH2, the circuit state shown in FIG. 3 is stable, that is, the relay RY1 will remain deenergized as illustrated. This is so because the thermistor TH2 is cooled by the liquid and therefore exhibits a high resistance so that insufficient voltage is applied to winding W2 to energize the relay. In contrast, thermistor TH1 is not cooled by the liquid and therefore heats to a relatively high temperature providing a low value of resistance. However, since thermistor TH1 is not connected to the relay winding W2 by contacts RY1A, it has no effect upon the relay's opeartion.

If, however, the liquid level drops below the lower therimstor TH2, that thermistor also will heat to a relatively high temperature and will exhibit a relatively low resistance. A low resistance at this point in the circut will cause an appreciable voltage to be applied to winding W2, the winding and the thermistor being effectively in series across the source voltage. Accordingly a substantial portion of the current flowing through the thermistor will flow through the winding, thereby energizing it to operate contacts RY1A and RY1B. Contacts RY1B then energize the valve winding W1 which actuates the valve 21 to its open position admitting liquid into tank 11.

While the movable arm of contacts RY1A moves between the fixed poles, the relay winding W2 is maintained energized by the energy stored in capacitor C1. When the movable arm reaches its opposite position, winding W2 will then be energized by thermistor TH1 which is already hot and exhibiting a low resistance value as discussed previously. Accordingly, the relay will remain energized by current flowing through the thermistor TH1. As tank 11 fills even though the liquid level again rises above thermistor TH2, since thermistor TH2 is disconnected from the relay winding W2 by the operation of contacts RY1A. When the liquid level reaches thermistor TH1, however, that thermistor is cooled and will then exhibit a relatively high resistance. The voltage across winding W2 then drops to a low value, as does the portion of the thermistor current drawn by winding W2 and thus and relay RY1 releases thereby deactuating valve 21 and cutting off the flow of water into the tank. Since thermistor TH2, being lower than thermistor TH1, is at this point already immersed in the liquid, the relay winding W2 will not be reenergized by the reversal of contacts RY1A and the switching circuit is again in the stable state described initially. In summary, it can be seen that the valve is opened whenever the liquid level falls below the lower of the two thermistors and is closed when the liquid level reaches the higher of the thermistors and that there is a dead zone or differential between the levels of the two thermistors in which the switching circuit SW1 and valve 21 remain in their previously established states.

Figure 4:
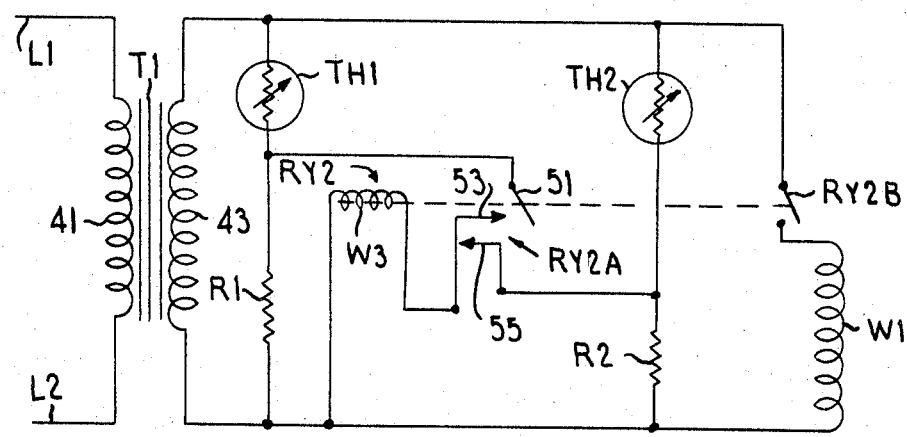
FIG. 4 is a schematic circuit diagram of another embodiment of liquid level control apparatus according to the present invention.

In FIG. 4 there is illustrated a modification of the switching circuit which obviates the use of the energy storage capacitor C1 and the diode D1. In this embodiment the transfer of control between the two thermistors is provided by a relay RY2 having an actuating winding W3, a set of valve actuating contacts RY2B and a set of make-before-break contacts RY2A for transferring control of relay winding W3 between the two thermistors TH1 and TH2. Contacts RY2A include a movable contact arm 51 which is opearted by the winding W3, a spring-loaded contact 53 and a fixed contact 55. Spring contact 53 is biased so as to normally engage contact 55. When relay winding W3 is energized, contact arm 51 first engages contact 53 and after this engagement it moves contact 53 out of engagement with contact 55. Thus there is a make-before-break contact action. Other types of make-before-break contacts are known in the art and may be used in the same manner.

Since relay winding W3 is always connected to one or the other of the sensor circuits, it is not necessary to store energy to maintain energization during a transit time between opposite positions. Accordingly, the capacitor C1 is omitted. Similarly, since there is no need for D.C. energy storage, winding W3 may be operated on A.C. and the diode D1 is also omitted. The operation of the circuitry shown in FIG. 4 is otherwise the same as that of the circuit of FIG. 3. When thermistor TH2 is uncovered by the liquid, it heats so as to provide a low value of resistance energizing winding W3. When winding W3 is energized, the valve is actuated to admit liquid into the tank and simultaneously the input circuit constituted by winding W3 is connected to the already heated upper thermistor TH1, the winding W3 being at all times connected to at least one of the thermistors. When the liquid level reaches the upper thermistor TH1, that thermistor is cooled and the resulting low value of resistance permits the relay RY2 to release thereby shutting off the flow of liquid into the tank.

While a valve means which selectively admits liquid into tank 11 has been shown, it will be understood that a valve means which is operated to release liquid from the tank may also be used to vary the liquid level in providing level control apparatus according to the present invention. The valve means may also include or be constituted by a pump for affecting or varying the liquid level. Further, while direct control of the switching means by the thermistors has been shown, additional power amplification of the thermistor signal may be used if desired.

In view of the above, it will be seen that the several objects of the invention are achieved and other advantageous results attained.

As various changes could be made in the above apparatus and methods without departing from the scope of the invention, it is intended that all matter contained in the above description or shown in the accompanying drawings shall be interpreted as illustrative and not in a limiting sense.

What is claimed is:

1. Apparatus for controlling, within predertimed limits, the level within a vessel of a liquid having substantial cooling capacity, said apparatus comprising:
   first and second thermistors having negative temperature coefficients of resistivity, said thermistors being adapted to be mounted for contact with said liquid at different levels relative to said vessel;
   electrically actuated valve means for varying the liquid level in said vessel;
   a relay including contacts for selectively actuating said valve means, said relay having a winding for operating said contacts and also having contacts, operated simultaneously with said valve means actuating contacts, for connecting said thermistors alternately in series with said winding thereby to apply to said winding at least a substantial portion of the current flowing through the respective thermistor; and
   circuit means for connecting the thermistors to a source of current thereby to heat them, when not in contact with said liquid, to a temperature at which the portion of the thermistor current applied to said winding will energize said relay, contact with said liquid being effective to cool the thermistors to a temperature at which the portion of the thermistor current applied to said winding will deenergize said relay whereby said valve means is actuated to maintain the level of said liquid between the levels of said thermistors.

2. Apparatus as set forth in claim 1 further comprising an energy storage capacitor connected in parallel with said winding for maintaining said winding energized during switching.

3. Apparatus as set forth in claim 1 wherein the contacts for connecting said thermistors to said winding are make-before-break contacts whereby said winding is always connected to at least one of said thermistors.

4. Apparatus as set forth in claim 1 wherein each of said thermistors includes an outer conductive casing, a conductive core coaxial with said casing and, between said casing and said core, a filling of a semi-conductor material the resistivity of which is highly dependent upon temperature.

References Cited
UNITED STATES PATENTS

| | | | |
|---|---|---|---|
| 2,557,727 | 6/1951 | Chandler | 317—132 X |
| 2,924,234 | 2/1960 | Wilson | 317—123.4 X |
| 2,976,463 | 3/1961 | Adams | 317—132 X |
| 3,181,557 | 5/1965 | Lannan | 137—392 X |
| 3,266,001 | 8/1966 | Landis et al. | 338—22 |

WILLIAM F. O'DEA, *Primary Examiner*

DAVID R. MATTHEWS, *Assistant Examiner*

U.S. Cl. X.R.

317—132; 338—22